Nov. 10, 1953  G. M. J. CREMER  2,658,285
PROCESS AND APPARATUS FOR THE DRYING OF CERAMIC GOODS
Filed Sept. 24, 1949
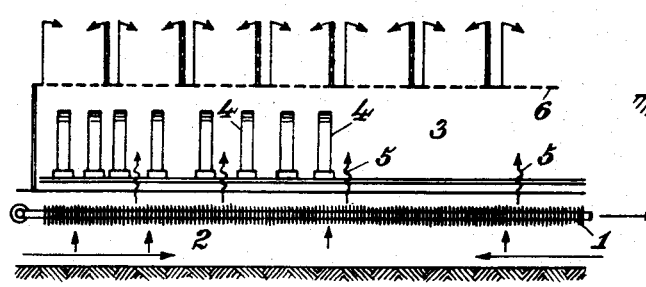
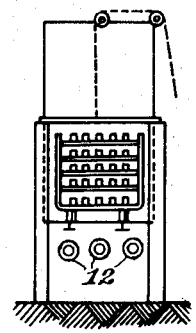
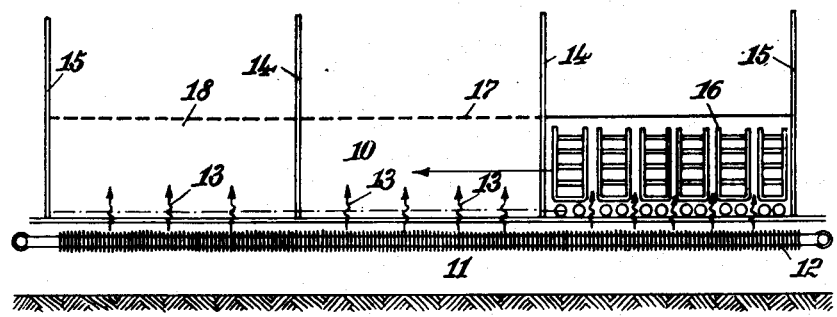
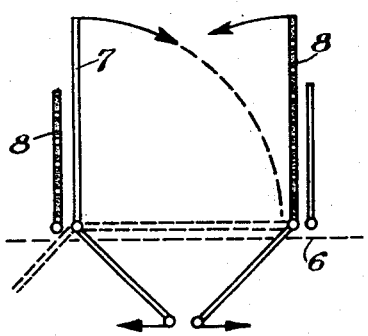
Inventor:
GOTTFRIED M. J. CREMER
by
Attorney Patented Nov. 10, 1953

2,658,285

UNITED STATES PATENT OFFICE 2,658,285

PROCESS AND APPARATUS FOR THE DRYING OF CERAMIC GOODS

Gottfried Marius Josef Cremer, Frechen, near Cologne, Germany

Application September 24, 1949, Serial No. 117,691

7 Claims. (Cl. 34—34)

This invention relates to a process and apparatus for the drying of ceramic goods.

It is known per se to subject crude ceramic goods to the so-called moist air method of drying. This consists in the goods being heated up to a definite temperature practically without giving up water and if possible directly to the core. Only when this process is finished is air supplied having a moisture content gradually becoming less, so that the goods are finally brought to a degree of dryness which permits firing.

This method of moist drying has been carried out both stationary and continuously.

The stationary systems for this method of drying operate however with somewhat high demands for power, which is necessary for the moistening of the air and its circulation, for example by means of fans. The process is consequently costly and uneconomical for mass production.

The continuous air drying takes place in so-called conduit or channel dryers, the goods to be dried being carried along oppositely to the hot air. This method has the drawback that the temperature and moisture content of the horizontally flowing air itself fluctuates, entirely different conditions obtaining close to the bottom from those in the vicinity of the dome. Even the use of expensive apparatus cannot ensure to a sufficient extent the necessary uniformity of the temperature and moisture conditions over the cross-section of the conduit.

It has also been proposed to carry out the moist air drying process in drying chambers. Here, however, the inlet and outlet of air and heat must first be correctly regulated and then supervised and in pactice it is again found that in this way the carrying out of the most air drying process is impossible or only possible to a very insufficient extent.

The invention obviates all these drawbacks. It allows of carrying out moist air drying without necessitating the provision of energy-absorbing and cost-increasing devices such as air circulators, measuring apparatus, switches and the like and without the necessity for continuous supervision of dampers, valves, and the like, in order to effect a regulation of the conditions. With the improved process, regulation takes place automatically, uniformity of conditions over the whole cross-section of the space in which the drying takes place being simultaneously ensured in the separate stages of the process, and the simple construction of the installation precludes faulty service resulting from carelessness, inattention, or the like.

This result is attained according to the invention by the drying taking place in a drying chamber in a hot air current rising vertically by natural buoyancy, the more rapid or slower course of the drying process being determined (depending upon the properties of the goods to be dried), by the degree of permeability of the chamber cover.

The process according to the invention can be carried out either as a stationary one or continuously with intermittent feed.

With the stationary process, the goods are placed in a chamber having an impermeable cover. The goods to be treated are heated in the air rising vertically due to natural buoyancy, the moisture of the air being thereby automatically regulated in that saturation of the hot air with moisture takes place by the moisture of the goods.

It has been shown that with the full saturation of the hot air with moisture the main requirement for the most favourable carrying out of the principle of moist air drying in the shortest time is attained.

The goods remain under the action of the hot air automatically saturated with moisture until a heating even of the core has taken place. As the movement of the hot air in the closed chamber under the action of its own buoyancy is practically to be neglected, a heating takes place in quiescent air and with completely uniform temperature, as also with completely uniform moisture content over the whole cross-section of the chamber. A drying of the surface on individual places is also prevented from taking place without penetration of the heat into the core, that is, any drying on the outer surface without a similar measure of drying in the core which, according to experience, would have as a consequence a collapse or cracking on the subsequent final drying.

As soon as the heating has taken place into the core, final drying out is effected with the cover of the chamber now made permeable.

The porosity of the cover permits, in this interval of the process, a withdrawal of the hot air saturated with moisture and replenishment with heated air from below whilst completely preserving the principle that the movement of the air takes place exclusively by the action of its own buoyancy. The porosity of the cover is adapted to the existing stage of the drying, that is, the degree of permeability varies according to the desired degree of fully drying.

It will be easily seen that in carrying out the process according to the invention no measuring apparatus has to be watched or valves or the like operated, but the conditions for a definite class of goods are adjusted and the maintenance of these conditions takes place practically automatically. It is only necessary to vary the porosity of the cover at certain intervals of time which takes place by the simple lifting or lowering of suitable valves or dampers. Since, furthermore, the movement of the air takes place exclusively by reason of its own buoyancy in so far as it is at all necessary in the individual stages, the use of energy-absorbing air circulators such as fans and the like is dispensed with.

With the continuous process with intermittent feed there are provided chambers connected one on to the other in conduit form and closed from each other, with varying cover porosity. An impermeable cover is used in the first chamber and the moist air drying is carried out in the same way as described in connection with the stationary process. As soon as the goods are dried right into the core, the slides are drawn out and the goods moved forward into the next chamber and the slides again closed. Covers with a different amount of porosity are provided in these chambers. It will be seen that the continuous process also can take place without additional plant and measuring apparatus, it being simply necessary to move the goods forward into the next chamber after certain periods previously determined by tests made.

The devices for carrying out the improved process are described below with reference to the accompanying drawings which represent two examples of embodiment without, however, the use of the process being limited to the employment of these means.

In the drawings:

Figure 1 shows diagrammatically a drying chamber for the stationary carrying out of the process according to the invention;

Figure 2 is a diagrammatic view of part of Figure 1 to an enlarged scale;

Figure 3 is a diagrammatic view of apparatus for carrying out the process continuously and Figure 4 is a vertical cross-section.

Close to the bottom of the chamber there is a steam or water heater 1. Preferably this steam heating device is in a kind of conduit 2 which extends underneath the entire chamber 3. This conduit is in connection with the outer air, so that fresh air is continuously supplied thereto. The goods 4 to be dried are placed in the chamber, the bottom of which consists of a grating or the like. The air heated by the heater can consequently as indicated by arrows 5 and in consequence of its own buoyancy rise upward. The cover 6 of the otherwise closed in chamber 3 is made of highly porous material. Porous ceramic plates or even plates which consist of wood wool with a binder of cement or the like can be used for this purpose. The cover thus allows the air to flow out of the chamber to a greater or less extent. This method of construction ensures that drying takes place exclusively in a rising current of air and any axial movement of the air in the chamber is avoided. In order to be able to adjust the porosity from complete impermeability down to the greatest extent of permeability, flaps or valves are necessary. Such flaps or dampers are shown diagrammatically in Figure 2. The plate 7 is quite impermeable and is laid together with the corresponding plates of the other chamber sections during the first stage of the moist air drying. Afterwards the plate 7 is raised, so that only the highly porous cover 6 is effective. Then again after a certain time the porous plate 8 is laid on, whereby the permeability of the cover is reduced. The regulation can naturally also take place by a plurality of porous plates being simultaneously laid down, which in practice takes place by the cover being porous in itself and its porosity being varied by the laying down of the other plate thereon.

For the continuous process operating with intermittent feed, there is provided a conduit dryer. The conduit dryer is shown in Figure 3 in an axial longitudinal section and in Figure 4 in a vertical cross-section both diagrammatically. Under the drying conduit 10 there is provided a conduit 11 for the fresh air supply. In this conduit is the steam or hot water heating device 12. The air enters, as can be seen from the arrows 13, under the action of its own buoyancy, vertically into the individual sections of the drying conduit 10 and flows only in the vertical direction, to escape through the cover or roof. According to the example shown, the conduit is subdivided by slides 14 into three chambers. There is also provided at both the entry and outlet ends, a closing slide 15. The first chamber 16 of the conduit is provided with a tight cover which is quite impermeable. The rising hot air is directly saturated with moisture, so that the moist air drying can be carried out in this chamber. When the goods are heated right through to the core, the slides 14 and 15 are drawn up and the whole contents moved forward by the length of a chamber towards the outlet end, and corresponding fresh goods are at the same time placed in the chamber 16.

In the second chamber 17 and the third chamber 18, permeable covers are provided the porosity of which is chosen to correspond to the drying procedure of the goods being dealt with. The final drying-out takes place in these two chambers. Naturally, it is possible to provide more than two chambers with porous covers. The number of the chambers to be employed depends upon the requirements placed on the goods to be dealt with.

With the continuous process with intermittent feed also no measuring apparatus has to be watched and no special regulation is necessary. It is only necessary to carry out the forward feed at previously determined intervals of time with the withdrawing of the slides.

Both with the stationary process and the continuous process, drying takes place quite uniformly over the whole cross-section of the installation. Both with respect to the effect on the goods themselves and from a thermotechnical point of view, the best possible effect is attained in this way, since the drying takes place necessarily in the upwardly moving air, a completely uniform pressure and temperature drop obtaining between the heating conduit and the outer space over the cover. In this way, it is consequently possible to carry out the drying in a period which practically corresponds to the theoretically shortest possible time of drying.

Having now particularly described and ascertained the nature of my said invention and in what manner the same is to be performed, I declare that what I claim is:

1. Process for the drying of ceramic goods in drying chambers in a vertical naturally induced warm air stream which escapes through the chamber top characterized in that the chamber top is closed by covers of different porosities which are applied selectively and subsequently during the drying process to vary the effective permeability of the chamber top.

2. Process according to claim 1, characterized in that the permeability is so regulated that the drying of the goods takes place with an impermeable cover to the chamber at the beginning of the drying process and the permeability gradually increases as the drying progresses.

3. Process according to claim 1, characterized in that the work is treated in continuous working order in successive rows arranged next to each other in chambers which can be cut off from each other, the first of which chambers for heating damp air has an impenetrable cover and the following chambers have covers of varying porosities.

4. Apparatus for drying ceramic goods, comprising a drying conduit having a number of consecutive individual chambers, heating means in said chambers arranged close to the bottom thereof, an impermeable cover for said first chamber, and covers of varying degrees of permeability for said succeeding chambers respectively and through which moisture saturated air is directly withdrawn.

5. Apparatus for drying ceramic goods, as claimed in claim 4, characterized in that consecutive chambers are combined into a tunnel-shaped assembly, and slides between adjacent chambers to enable them to be separable one from another.

6. Apparatus for drying ceramic goods, as claimed in claim 4, characterized in that the permeable covers consist of porous ceramic plates, and a cement binder for said plates.

7. Apparatus for drying ceramic goods, as claimed in claim 4, characterized in that the permeable covers consist of permeable plates of wood wool, and a cement binder for said plates.

GOTTFRIED MARIUS JOSEF CREMER.

References Cited in the file of this patent

UNITED STATES PATENTS

| Number | Name | Date |
|---|---|---|
| 348,838 | Gregg | Sept. 7, 1886 |
| 514,406 | Barrow | Feb. 6, 1894 |
| 667,478 | Wolf | Feb. 5, 1901 |
| 669,994 | Link | Mar. 19, 1901 |
| 799,437 | Bechtel | Sept. 12, 1905 |
| 1,005,243 | Linn | Oct. 10, 1911 |
| 1,072,302 | Boss | Sept. 2, 1913 |
| 1,103,435 | Rodgers | July 14, 1914 |
| 1,119,045 | Schaffer | Dec. 1, 1914 |
| 1,460,378 | Hicks et al. | July 3, 1923 |
| 2,444,383 | Stynler | June 29, 1948 |